Jan. 26, 1937.　　　L. GOLDHAMMER　　　2,068,911
PHOTOGRAPHIC SHUTTER
Filed Aug. 7, 1935　　　3 Sheets-Sheet 1
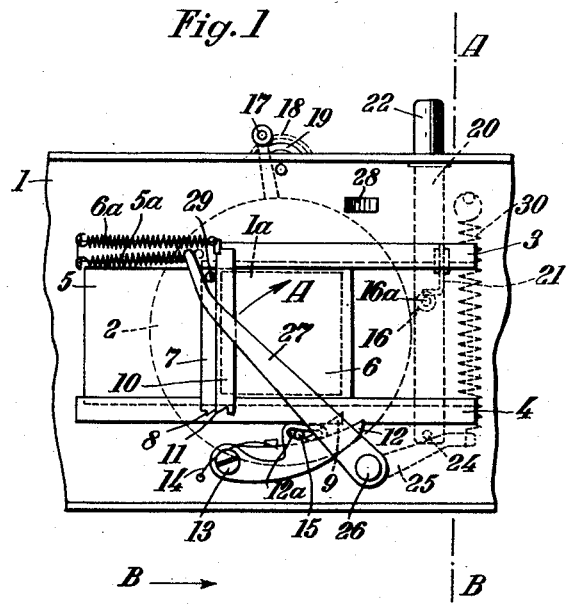
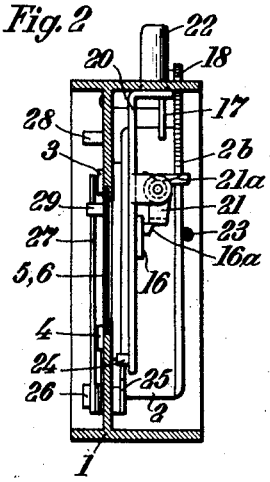 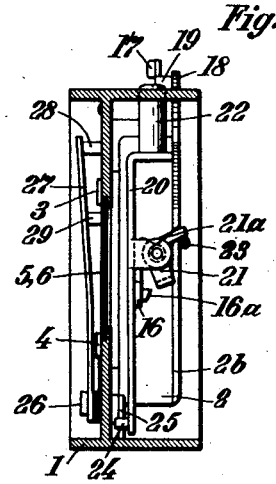
Leo Goldhammer  Inventor
By　Attorney Jan. 26, 1937.  L. GOLDHAMMER  2,068,911
PHOTOGRAPHIC SHUTTER
Filed Aug. 7, 1935  3 Sheets-Sheet 2
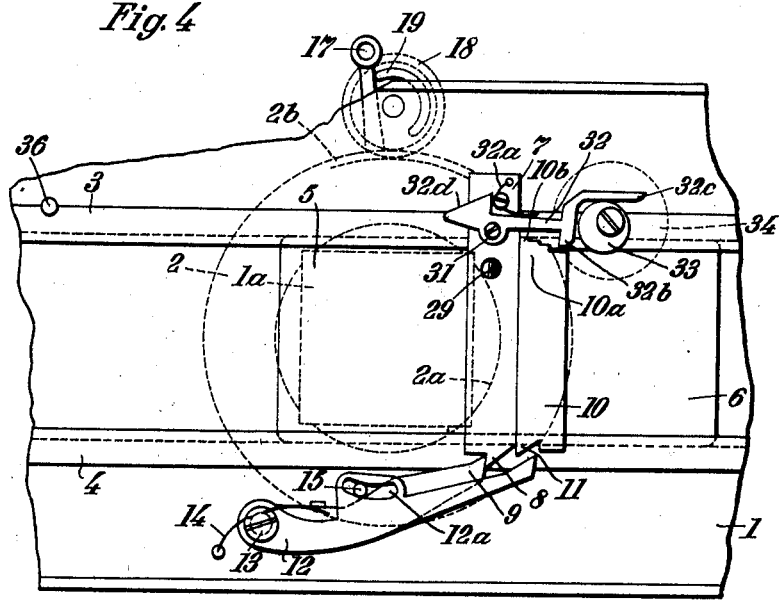
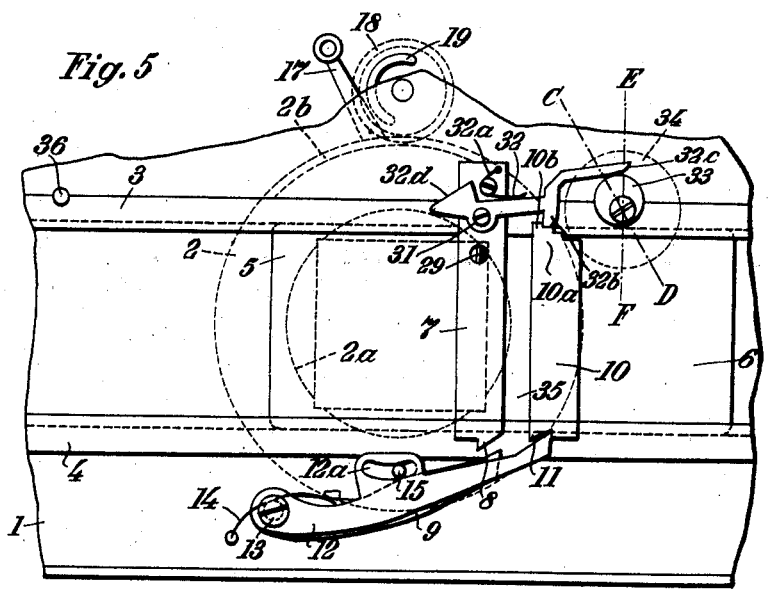
Leo Goldhammer  Inventor
By  Attorney Jan. 26, 1937.   L. GOLDHAMMER   2,068,911
PHOTOGRAPHIC SHUTTER
Filed Aug. 7, 1935   3 Sheets-Sheet 3

Leo Goldhammer   Inventor

By   Attorney

Patented Jan. 26, 1937

2,068,911

UNITED STATES PATENT OFFICE 2,068,911

PHOTOGRAPHIC SHUTTER

Leo Goldhammer, Munich, Germany, assignor to Agfa Ansco Corporation, Binghamton, N. Y., a corporation of New York Application August 7, 1935, Serial No. 35,026
In Germany August 9, 1934

4 Claims. (Cl. 95—55)

My present invention relates to a photographic shutter.

One of its objects is an improved photographic shutter. Further objects will be seen from the detailed specification following hereafter.

The use of the known central shutter or sector shutter is not advantageous in photographic cameras, particularly in the case of those of small form, because such a shutter does not permit very short exposure. Moreover, the objective cannot be exchanged, since the shutter blades are contained between the forward and rear parts of the objective. For these reasons, in the expensive baby cameras, focal plane shutters are used which, however, require comparatively much space and their parts must be constructed in the camera casing. Owing to this difficult construction the cost of the whole apparatus is much increased. Moreover in very short exposures it was always necessary to put under tension a driving spring and to release this by a special lever before exposure.

The present invention overcomes these disadvantages by actuating a simple focal-plane shutter with metallic blind slides by the mechanism of a sector or central shutter. The operation consists in the depression of a single push button which sets the shutter spring and releases it immediately after the setting. In this manner the focal-plane shutter, operated by the central shutter mechanism, becomes a so-called automatic shutter, that is to say one the driving spring of which sets itself when released. The setting of the camera for exposure is improved, the range of exposures is increased and the construction of the shutter mechanism is considerably simplified as it can be done outside the camera. Moreover, such shutters have been a great advantage as all the parts may be made of metal and, besides comparatively long exposures of, for example, ½ to 1 second, it is also possible to use quite short exposures by adjusting the space between the blind-slides.

For adjusting the distance of the slides there may be provided, in addition to the general adjusting disc a separate excentric disc adjustable directly by hand. The shutter can, however, be further improved and simplified by adjusting all exposure times by a single adjusting disc. For this purpose the adjusting disc is connected with the exposure adjusting ring of the sector shutter mechanism by a tooth drive and the said ring of the sector shutter mechanism is provided with a stop which, at the correct moment, comes into the range of a latch which adjusts the distance of the slides (width of the slot).

The latch that adjusts the distance of the slides engages in a tooth or notch of the following shutter slide. In order that the width of the slot may remain constant during the whole course of the exposure the notches are so placed that the latch cannot disengage itself from the notch.

The accompanying drawings illustrate the invention, of which they show two forms:

Fig. 1 is an elevation of the improved shutter with a separate disc for adjusting the distance of the slides.

Fig. 2 is a section on line A—B of the released shutter.

Fig. 3 is a section on line A—B of the shutter set shortly before its release.

Fig. 4 is an elevation of the device for adjusting the width of the slot when the shutter is set.

Fig. 5 is a like view shortly before the release of the shutter.

Figure 6:
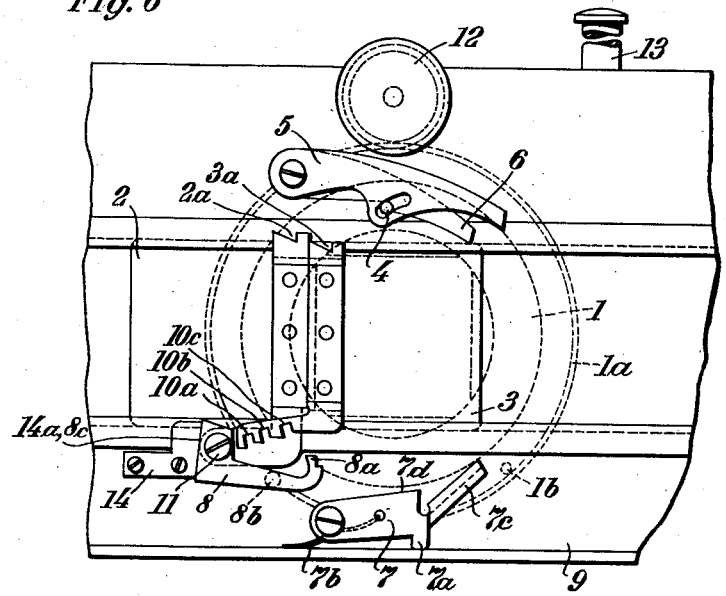
Fig. 6 is an elevation of the shutter in released position, when the width of the slot is adjusted by a single disc under all conditions for the adjustment of the speed of exposure.

Referring first to Figs. 1 to 5, for the sake of clearness the device for adjusting the width of the slot has been omitted from Figs. 1, 2 and 3.

In the wall of the casing 1 there is on the one side a central shutter 2 and on the other side a focal-plane shutter with metallic blind-slides, carried in the guides 3 and 4. The central shutter 2 of known construction has a central opening 2a within which is the picture window 1a. The central shutter, however, has no sector or blades. Between the guides 3, 4 are two shutter slides, the leader 5 and the follower 6. Both slides are held back in their position of rest by their respective springs 5a, 6a. On the leading slide there is fixed a rail 7 which carries at one end a projecting tooth 8 adapted to engage the pawl 9. In like manner the following slide 6 has a transverse rail 10 carrying a projecting tooth 11 which can engage a pawl 12. Pawls 9 and 12 are pivoted on a screw 13. By the spring 14 the pawl 9 is held lightly against the pin 15. The pawl 12 engages the pin 15 by means of a slot 12a. This pin is on the sector ring of the central shutter 2. It extends through the wall of the casing 1 and transmits its movement to the pawls 9 and 12. The sector shutter is in known manner set by the lever 16 and released by the lever 17. The sector shutter must also be set for long-time and for snapshot exposures. The front rotatable ring 2b mounted in the central shutter casing 2 is toothed on a portion of its periphery and can be adjusted by a small pinion 18 to the desired speed of exposure. On the rear side of this pinion 18 is a cam surface 19 concentric with the pinion so that when the adjustment of the sector shutter is for momentary exposure (1 to 1/200 sec.) the release lever 17 is brought into the released position and retained therein (see Fig. 5).

On the wall of the casing 1 there is a sliding rail 20 which is actuated by a press-button 22. On the rail 20 is pivoted a small bell crank lever 21 which by a spring 21a is urged into the position shown in Fig. 2.

The operation of the shutter is as follows:

When the button 22 is depressed the lever 21 which engages the chamfered pin 16a on the lever 16 of the sector shutter 2 is turned outwards. Shortly before the end of this outward movement the bell crank 21 strikes with its horizontal arm against a stationary pin 23 and is turned thereby, see Fig. 3, thus opening the way for the release of the lever 16. This release follows immediately in the case of instantaneous exposure and automatically, because, as already described, the release lever 17 is in the release position. At the same time, however, during this operation the slides 5 and 6 have been put under tension. The pin 24 on the rail 20 presses the lever 25, on the pivot of which is fixed the arm 27. Thus the arm 27 swings across the shutter opening 1a in the direction of the arrow A in Fig. 1, and carries with it both the slides 5 and 6 by engagement with the pin 29. At the end of this movement the arm 27 is bent sideways by means of a wedge piece 28 fixed to the casing 1. This movement is sufficient to free the pin 29 from its engagement with the arm and the two slides are held by engagement with their teeth 8 and 11 respectively with the pawls 9 and 12. In the directly following release of the sector shutter 2 the pin 15 moves in the direction of the arrow B (Fig. 1) whereby the pawl 9 is pressed to one side and slide 5 is liberated, so that it is drawn back under the action of spring 5a and uncovers the opening 1a. In the further course of the movement of pin 15, the duration of which is determined by the adjusting mechanism of the sector shutter, the pawl 12 is moved to one side, thus liberating the slide 6 and again closing the opening 1a. When the button 22 is released the spring 30, which engages the lever 25, returns it to normal position, so that the bell crank 21 in its upward movement slides over the inclined surface of the pin 16a and the arm 27 over the inclined surface of the pin 29 so that in the next operation of the shutter the arm can perform again the same action. With aid of a shutter thus adjusted instantaneous exposures from 1 to 1/200 sec. can be made.

If snapshot exposures of less than 1/200 sec. are required the sector shutter should be adjusted to 1/200 and the width of the slot of the slides 5.6 adjusted beforehand, these slides in this case moving forward together. For this purpose a suitable construction is provided which may be understood from Figs. 4 and 5. Certain parts which are shown in Figs. 1, 2 and 3 are omitted in Figs. 4 and 5 for the sake of clearness.

On the transverse rail 7 of the slide 5 a hooked lever 32 is pivoted at 31 and is pressed inwards by a spring 32a. The upper end of the transverse rail 10 of the slide 6 is of stepped form. In one of these steps engages the hook 32b of the lever 32, accordingly as the adjustment is made. The hook 32b has a surface 32c in contact with the excentric 33 and serves to adjust the width of the slot. For example, in the position shown in Fig. 4, the adjustment is for the smallest width of slot, namely 0.5 mm. while in Fig. 5 the hook 32b in engaging the last step 10b, and the width of slot is, for example 3 mm. When the slide 5 is released by the pawl 9 there occurs only the formation of slot corresponding with the position of the excentric 33. This excentric is adjusted by means of a disc 34 on which the exposure speeds (1/500, 1/800 and 1/1000 or the like sec.) are marked correspondingly with the slot widths. After the release of the following slide 6 both slides return together to the starting position, whereby an exposure occurs through the slot 35 remaining between the slides. At the end of the release movement the inclined end 32d of the lever 32 engages the fixed pin 36 and is thereby raised from the end 10a of the rail 10. The slot is, therefore, completely closed so that in the following setting of the shutter the slides 5 and 6 pass into the opening 1a in closed position. When the eccentric 33 is moved to a mark zero on the disc 34 so that the line C—D coincides with the line E—F, the lever 32 can pass freely over the stepped end 10a of the slide 6 and the two slides are thus uncoupled. This positioning of the disc 34 is necessary for instantaneous exposures from 1–1/200 sec. as well as for long-time and for short-time exposures.

When a long-time or a short-time exposure is to be made the pinion 18 which carries on its face the indications for the speeds of exposure is turned to B or T. In this case the circular cam 19 on the back of the pinion is brought into such a position that the release lever can move back (Fig. 4). By depressing the button 22 in this case only the sector shutter is put under tension, while the release must be by means of the lever 17.

Figure 7:
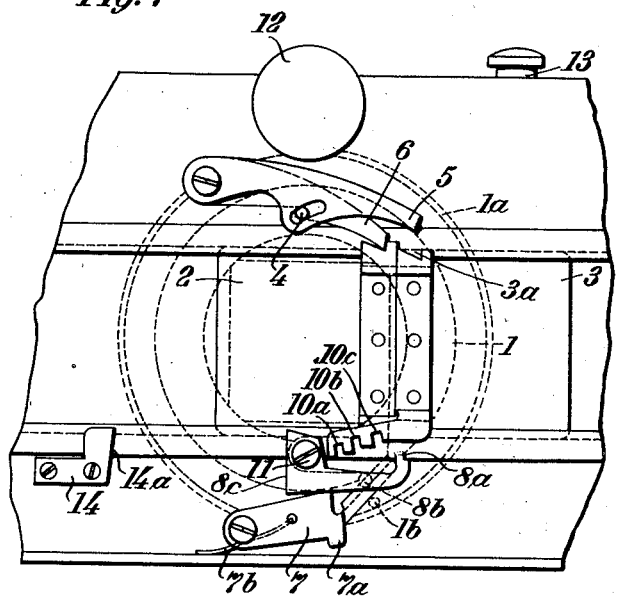
Fig. 7 is a like view of the shutter in set condition.

Referring now to Figs. 6 and 7, the central shutter mechanism controls, with aid of the pin 15, the shutter slides 5 and 6 in such a manner that after the adjustment of the shutter by means of the ring 2b the slides 5 and 6 follow each other at shorter or longer distances apart. The adjusting ring 2b carries a pin 37 which serves to bring the spring lever 38 into the path of the latch 39 for the purpose of adjusting the slot between the slides 5 and 6. A spring 38b presses the lever 38 so that its projection 38a is constantly against the outer wall 40 of the casing. The bent free end 38c of the lever 38 projects into the path of the pin 37 which, as the ring 2b is rotated, comes against the lever and turns it against the action of the spring 38b. In this movement the inclined face 38d of the lever 38 presses aside the latch 39 which carries a detent tooth 39a, so that this tooth, according to adjustment, engages in one of the steps 10b, 10c, 10d on the release of the shutter and thereby regulates the distance between the slides 5 and 6. The pivot of the latch 39 is indicated by 31 while the pin comes into contact with the surface 38d as indicated by 39b. In this construction all exposure times are adjusted by a single disc 18 which is itself a pinion and engages the similarly toothed adjusting ring 2b. After the adjustment of the desired time of exposure by means of the disc 18 the shutter is set by means of the lever 22 and the film is simultaneously advanced by one picture length. With an adjustment for quite short exposure, namely 1/250 and 1/1000 sec. the width of the slot is set during the movement of the shutter, as is represented in Fig. 7. The shutter is released either by the button 22 or by a separate release lever, not shown. In the course of the exposure the inclined surface 39c of the latch 39 strikes the inclined surface 41a of the fixed step 41; in this manner the latch 39 after each exposure is returned to its original position. The latch 39 has sufficient friction in its bearing 31 to keep it stationary in any position.

The pawls 9 and 12 engage notches 8', 11' of the slides 5 and 6. The tooth 39a and the notches 10b, 10c and 10d are hook-shaped so that the slot cannot be altered during movement of the slides 5 and 6. The tooth 39a is withdrawn after the exposure by the striking of the surfaces 39c and 41a on the notches 10b, 10c, 10d.

It is obvious that with the aid of the disc 18 the adjustment can be made also for long-time or for short-time exposure. In this adjustment the pin 37 does not come into the path of the lever 38. The slides 5 and 6 are as usual brought into the set position (compare Fig. 7) by means of the button 22, but it is prevented that, by a depression of the button 22, the sector shutter mechanism is set. The arrangement for preventing the setting of the shutter mechanism in long-time and short-time exposure may consist, for example of a wedge-shaped surface which can be controlled by the disc 18 and in the said exposure brings the setting lever of the shutter mechanism out of the range of the button 22. As, however, there are also sector shutter mechanisms which must be set also for short-time and long-time exposures this device is not unconditionally necessary.

What I claim is:

1. A photographic shutter comprising slide shutters comprising a leader and a follower, resilient means for maintaining said slide shutters in normal position, means for sliding said slide shutters against the action of said resilient means, a sector shutter tensioning mechanism and a sector shutter release mechanism, means for actuating said sector shutter tensioning mechanism in operative connection with said means for sliding said slide shutters, means for maintaining said slide shutters in the position to which they are moved by said sliding means, and means controlled by said sector shutter release mechanism for releasing said slide shutters.

2. A photographic shutter comprising slide shutters comprising a leader and a follower, resilient means for maintaining said slide shutters in normal position, a lever movable over the face of said slide shutters and adapted to engage with means on a slide shutter for sliding said shutters against the action of said resilient means, a sector shutter tensioning mechanism and a sector shutter release mechanism, means for actuating said lever and for tensioning said sector shutter tensioning mechanism, means for maintaining said slide shutters in the position to which they are moved by said sliding means, and means controlled by said sector shutter release mechanism for releasing said slide shutters.

3. A photographic shutter comprising slide shutters comprising a leader and a follower, resilient means for maintaining said slide shutters in normal position, a lever movable over the face of said slide shutters and adapted to engage with means on a slide shutter for sliding said shutters against the action of said resilient means, a sector shutter tensioning mechanism and a sector shutter release mechanism, means for actuating said lever and for tensioning said sector shutter tensioning mechanism, means for maintaining said slide shutters in the position to which they are moved by said sliding means, means for coupling said slide shutters to maintain a definite distance between them when released one after the other, and means controlled by said sector shutter release mechanism for releasing said slide shutters one after the other.

4. A photographic shutter comprising slide shutters comprising a leader and a follower, resilient means for maintaining said slide shutters in normal position, a lever movable over the face of said slide shutters and adapted to engage with means on a slide shutter for sliding said shutters against the action of said resilient means, a sector shutter tensioning mechanism and a sector shutter release mechanism, means for actuating said lever and for tensioning said sector shutter tensioning mechanism, means for maintaining said slide shutters in the position to which they are moved by said sliding means, means for coupling said slide shutters to maintain a definite distance between them when released one after the other, means cooperating with said coupling means for varying said distance between said slide shutters for adjustment to different times of exposure, and means controlled by said sector shutter release mechanism for releasing said slide shutters one after the other.

LEO GOLDHAMMER.